(12) United States Patent
Nagakura

(10) Patent No.: US 9,273,592 B2
(45) Date of Patent: Mar. 1, 2016

(54) HYBRID VEHICLE AND METHOD FOR CONTROLLING THE SAME

(71) Applicant: Keisuke Nagakura, Toyota (JP)

(72) Inventor: Keisuke Nagakura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 431 days.

(21) Appl. No.: 13/736,369

(22) Filed: Jan. 8, 2013

(65) Prior Publication Data

US 2013/0174806 A1    Jul. 11, 2013

(30) Foreign Application Priority Data

Jan. 11, 2012  (JP) ................................. 2012-003070

(51) Int. Cl.
*F02B 17/00*        (2006.01)
*B60W 20/00*       (2006.01)
(Continued)

(52) U.S. Cl.
CPC .............. *F02B 17/005* (2013.01); *B60W 10/06* (2013.01); *B60W 10/08* (2013.01); *B60W 20/00* (2013.01);
(Continued)

(58) Field of Classification Search
CPC ..... B60W 20/00; B60W 10/08; B60W 10/06; B60W 2710/0677; B60W 2710/1061; B60W 30/182; B60W 30/1882; B60W 2520/10; B60W 2710/0644; B60W 2710/083; B60W 2710/105; B60W 20/10; B60W 2710/0666; B60W 20/108; Y02T 10/6286; Y02T 10/44; Y02T 10/642; Y02T 10/56; Y02T 10/7275; B60K 6/445; B60K 1/02; B60K 6/365; F02D 41/3094; F02D 41/221; F02N 11/0814; F02B 17/005; F02B 17/00; B60L 2240/486; B60L 2240/421; B60L 2240/423; B60L 11/123; B60L 11/14; B60L 2220/14
USPC ......... 123/296, 233, 521, 179.3, 406.67, 308, 123/432, 179.4, 406.47; 701/22, 112, 54, 701/102, 103, 104, 113, 114; 180/65.265, 180/65.235, 65.21; 477/2; 73/114.04, 73/114.45; 903/902, 910, 930
See application file for complete search history.

(56) References Cited

U.S. PATENT DOCUMENTS 5,789,881 A * 8/1998 Egami ................... B60K 6/485
                                              180/65.245
6,131,680 A * 10/2000 Nii .......................... B60K 6/40
                                              180/65.235
(Continued)

FOREIGN PATENT DOCUMENTS

JP    2005-226553 A    8/2005
JP    2009-180171 A    8/2009
(Continued)

*Primary Examiner* — Hung Q Nguyen
*Assistant Examiner* — John Bailey
(74) *Attorney, Agent, or Firm* — Dinsmore & Shohl LLP

(57) ABSTRACT

A hybrid vehicle includes: an internal combustion engine having an in-cylinder injection valve directly injecting fuel into a combustion chamber and a port injection valve injecting fuel into an intake port; and a motor generator, and causes a torque equal to a user required torque to act on a drive shaft by controlling output torques of the engine and motor generator. When a misfire is not detected, the hybrid vehicle operates the engine at an engine operation point at which an engine power satisfies an engine required power in a first engine operation line. When a misfire is detected, the hybrid vehicle operates the engine at an engine operation point at which the engine power satisfies the engine required power in a second engine operation line, causes one of the injection valves to inject an entire amount of fuel, and determines which one is abnormal.

4 Claims, 9 Drawing Sheets

(51) Int. Cl.
  *F02D 41/14* (2006.01)
  *F02D 41/22* (2006.01)
  *F02D 41/30* (2006.01)
  *G01M 15/11* (2006.01)
  *B60W 10/06* (2006.01)
  *B60W 10/08* (2006.01)

(52) U.S. Cl.
  CPC ........... *B60W 20/50* (2013.01); *F02D 41/1497* (2013.01); *F02D 41/221* (2013.01); *F02D 41/3094* (2013.01); *G01M 15/11* (2013.01); *B60Y 2300/432* (2013.01); *F02D 2041/224* (2013.01); *F02D 2200/101* (2013.01); *F02D 2200/1015* (2013.01); *Y02T 10/6286* (2013.01)

(56) References Cited

U.S. PATENT DOCUMENTS

| | | | | |
|---|---|---|---|---|
| 6,522,024 | B1* | 2/2003 | Takaoka | B60K 6/445 180/65.235 |
| 8,261,721 | B2 | 9/2012 | Mizuno et al. | |
| 8,280,570 | B2* | 10/2012 | Masuda | B60W 10/06 180/65.235 |
| 8,332,127 | B2 | 12/2012 | Gwidt | F02D 37/02 123/406.11 |
| 2003/0102175 | A1* | 6/2003 | Wakashiro | B60K 6/485 180/65.26 |
| 2005/0193980 | A1* | 9/2005 | Doering | F01N 3/0814 123/406.47 |
| 2005/0197236 | A1* | 9/2005 | Doering | F02D 41/0087 477/181 |
| 2007/0028889 | A1* | 2/2007 | Ogawa | F02D 13/0253 123/295 |
| 2007/0051351 | A1* | 3/2007 | Pallett | F02D 17/02 123/692 |
| 2007/0101806 | A1* | 5/2007 | Yamaguchi | B60K 6/365 73/114.04 |
| 2007/0215096 | A1* | 9/2007 | Kumano | F02D 35/023 123/295 |
| 2007/0289577 | A1* | 12/2007 | Yamaguchi | F02D 41/042 123/446 |
| 2008/0208420 | A1* | 8/2008 | Wozniak | B60L 9/00 701/54 |
| 2008/0296908 | A1* | 12/2008 | Utsumi | F02D 29/02 290/40 C |
| 2009/0063007 | A1* | 3/2009 | Masuda | B60W 10/06 701/102 |
| 2009/0151469 | A1* | 6/2009 | Suzuki | B60K 6/445 73/847 |
| 2009/0308145 | A1* | 12/2009 | Suzuki | B60K 6/445 73/114.04 |
| 2010/0030455 | A1* | 2/2010 | Akimoto | B60K 6/448 701/111 |
| 2010/0038158 | A1* | 2/2010 | Whitney | B60K 6/365 180/65.265 |
| 2010/0057330 | A1* | 3/2010 | Whitney | F02D 11/105 701/103 |
| 2010/0076635 | A1* | 3/2010 | Sugimoto | B60K 6/445 701/22 |
| 2010/0088010 | A1* | 4/2010 | Verdejo | B60K 6/485 701/105 |
| 2010/0152991 | A1* | 6/2010 | Suzuki | G01M 15/11 701/99 |
| 2010/0218598 | A1* | 9/2010 | Suzuki | F02D 41/1497 73/114.04 |
| 2010/0241297 | A1* | 9/2010 | Aoki | B60W 30/192 701/22 |
| 2011/0017176 | A1* | 1/2011 | Mizuno | F02D 41/1221 123/486 |
| 2011/0253100 | A1* | 10/2011 | Kaiser | F02D 41/0085 123/406.24 |
| 2011/0253101 | A1* | 10/2011 | Mathews | F02P 5/045 123/406.27 |
| 2012/0010044 | A1* | 1/2012 | Gibson | B60W 10/023 477/52 |
| 2012/0136552 | A1* | 5/2012 | Kato | F02D 41/22 701/102 |
| 2012/0203411 | A1* | 8/2012 | Mallebrein | B60K 6/48 701/22 |
| 2012/0209480 | A1* | 8/2012 | Hamane | B60W 10/06 701/54 |
| 2013/0045832 | A1* | 2/2013 | Whitney | F02D 41/023 477/3 |
| 2013/0045835 | A1* | 2/2013 | Schang | B60W 10/06 477/78 |
| 2013/0173103 | A1* | 7/2013 | Ando | F02D 41/1497 701/22 |
| 2013/0226380 | A1* | 8/2013 | Ando | B60W 20/108 701/22 |
| 2013/0282221 | A1* | 10/2013 | Harada | B60K 6/445 701/22 |
| 2013/0291830 | A1* | 11/2013 | Doering | F02D 41/023 123/350 |
| 2013/0296123 | A1* | 11/2013 | Doering | B60W 10/02 477/5 |
| 2013/0296124 | A1* | 11/2013 | Pietron | B60W 20/40 477/5 |
| 2013/0296125 | A1* | 11/2013 | Gibson | B60W 20/10 701/22 |
| 2013/0296126 | A1* | 11/2013 | Gibson | F02N 11/006 477/5 |
| 2013/0296130 | A1* | 11/2013 | Banker | B60W 10/184 477/27 |
| 2013/0297120 | A1* | 11/2013 | Reed | B60W 10/196 701/22 |
| 2013/0297122 | A1* | 11/2013 | Gibson | B60W 20/40 701/22 |
| 2013/0297123 | A1* | 11/2013 | Gibson | B60W 20/1084 701/22 |

FOREIGN PATENT DOCUMENTS

JP 2009-293436 A 12/2009
JP 2011-026961 A 2/2011

\* cited by examiner

F I G . 1
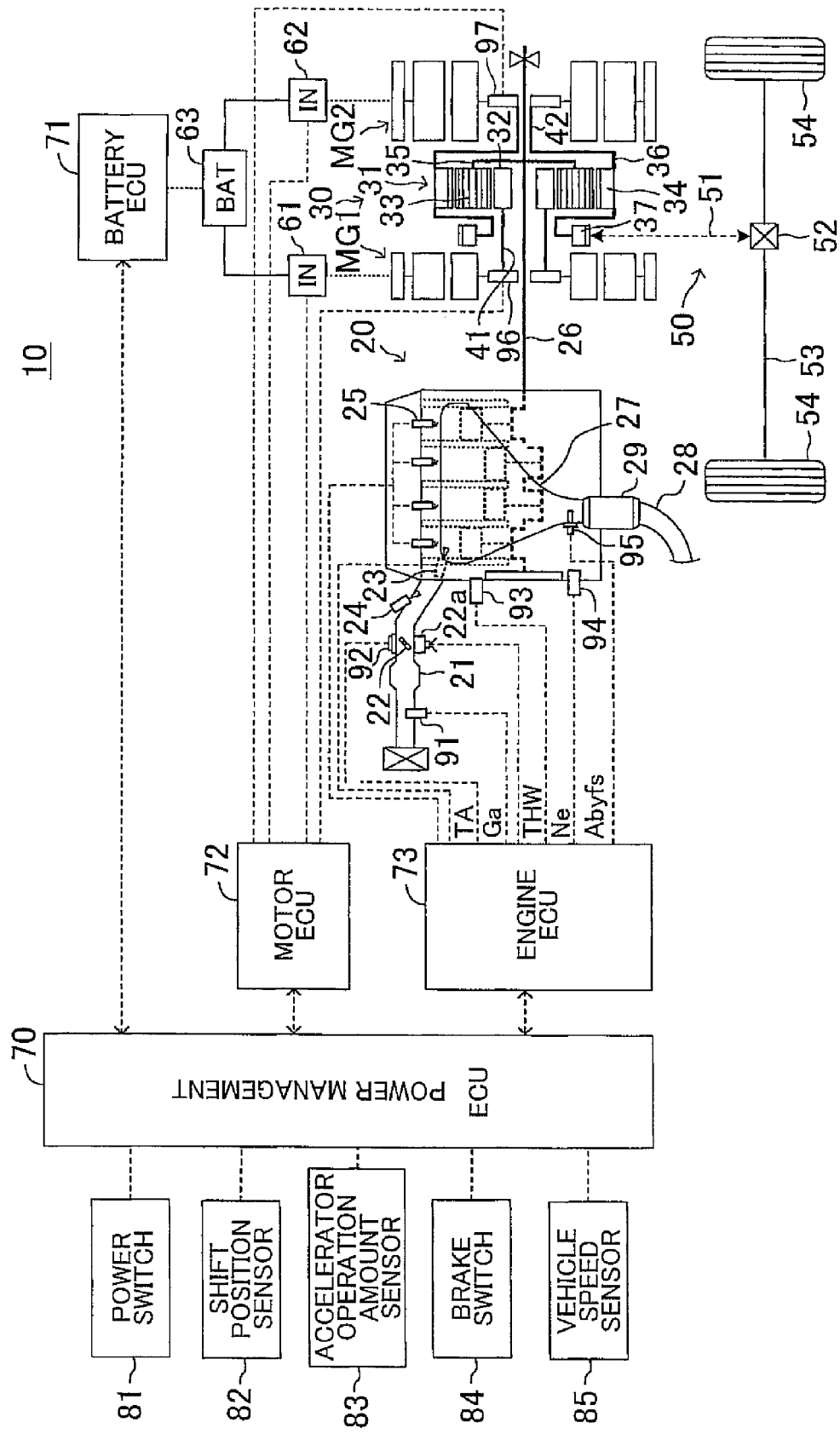

HYBRID VEHICLE AND METHOD FOR CONTROLLING THE SAME

INCORPORATION BY REFERENCE

The disclosure of Japanese Patent Application No. 2012-003070 filed on Jan. 11, 2012 including the specification, drawings and abstract is incorporated herein by reference in its entirety.

BACKGROUND OF THE INVENTION

1. Field of the Invention

The invention relates to a hybrid vehicle that includes an internal combustion engine, having an in-cylinder injection valve and a port injection valve, and an electric motor as drive sources (power sources), and that travels while controlling an output torque of each of the drive sources. The invention also relates to a method for controlling the hybrid vehicle.

2. Description of Related Art

A hybrid vehicle includes an internal combustion engine and an electric motor as drive sources that generate driving force for propelling the vehicle. That is, the hybrid vehicle travels by transmitting torque, which is generated by at least one of the engine and the electric motor, to a drive shaft connected to drive wheels of the vehicle.

Incidentally, a hybrid vehicle may also include an internal combustion engine that includes a fuel injection valve that directly injects fuel into a combustion chamber (that is, in-cylinder injection valve) and a fuel injection valve that injects fuel into an intake port that communicates with the combustion chamber (that is, port injection valve). One of such hybrid vehicles that include an engine having an in-cylinder injection valve and a port injection valve is configured to execute any one of a port injection drive mode, an in-cylinder injection drive mode and a common injection drive mode for the purpose of carrying out various abnormality diagnoses (for example, see Japanese Patent Application Publication No. 2005-226553 (JP 2005-226553 A)). The port injection drive mode is a mode in which the entire amount of fuel that is supplied to the engine is injected from the port injection valve. The in-cylinder injection drive mode is a mode in which the entire amount of fuel that is supplied to the engine is injected from the in-cylinder injection valve. The common injection drive mode is a mode in which fuel is injected from both the in-cylinder injection valve and the port injection valve.

Incidentally, the hybrid vehicle determines an engine required power on the basis of a torque that is determined on the basis of a user's accelerator operation amount (that is, a user required torque that is required to rotate the drive shaft of the vehicle). Furthermore, the hybrid vehicle controls the engine at an engine operation point in a first engine operation line (optimal engine operation line) such that the power of the engine satisfies the engine required power and the operation efficiency of the engine is optimal.

On the other hand, in the above-described engine, when it is determined that a misfire has occurred in the case where the engine is being operated in the common injection drive mode, it is desirable to be able to identify whether the misfire has occurred due to an abnormality of the in-cylinder injection valve or the misfire has occurred due to an abnormality of the port injection valve. In order to identify which injection valve causes a misfire, it is required to operate the engine in one of the in-cylinder injection drive mode and the port injection drive mode.

On the other hand, when the port injection drive mode is continued in a state where the load of the engine is relatively high, the temperature near a fuel injection hole (nozzle) of the in-cylinder injection valve becomes excessively high. Thus, it is difficult to make the above identification by continuing the port injection drive mode in a state where the load of the engine is high. In contrast to this, in a state where the load of the engine is relatively low, it is possible to continue the port injection drive mode and the in-cylinder injection drive mode over a relatively long period of time although there is a limit.

Thus, when it is determined that a misfire has occurred in the case where the engine is being operated in the common injection drive mode, it is conceivable to identify (determine) which injection valve is abnormal by decreasing the load of the engine and operating the engine in one of the in-cylinder injection drive mode and the port injection drive mode and, in this case, determining whether a misfire occurs.

However, when the operating state of the engine is simply changed from a high load state to a low load state, an engine output torque decreases, so a torque that acts on the drive shaft becomes smaller than the user required torque and, as a result, the user may experience a feeling of strangeness. Furthermore, depending on the characteristics of the in-cylinder injection valve and port injection valve, it may be possible to operate the engine in one of the in-cylinder injection drive mode and the port injection drive mode in a predetermined load range other than a low load range. In this case, in order to identify which injection valve is abnormal, it is conceivable that the operating state of the engine is changed from a low load state to a high load state. At this time, the engine output torque increases, so the torque that acts on the drive shaft becomes larger than the user required torque, so, still, the user may experience a feeling of strangeness.

SUMMARY OF THE INVENTION

The invention provides a hybrid vehicle that is able to identify or determine which one of an in-cylinder injection valve and a port injection valve is in an abnormal condition that causes a misfire while bringing a torque that acts on a drive shaft of the vehicle into coincidence with a user required torque.

A first aspect of the invention provides a hybrid vehicle. The hybrid vehicle includes: an internal combustion engine that includes an in-cylinder injection valve and a port injection valve, the in-cylinder injection valve directly injecting fuel into a combustion chamber, and the port injection valve injecting fuel into an intake port that communicates with the combustion chamber; an electric motor; a power transmission mechanism configured to couple a drive shaft of the hybrid vehicle to the engine to transmit torque and to couple the drive shaft to the electric motor to transmit torque; a driving force control unit configured to control the engine and the electric motor such that a torque being determined on the basis of a user's accelerator operation amount is caused to act on the drive shaft, the torque being equal to a user required torque, which is a torque required to rotate the drive shaft; and an abnormality determination unit configured to determine whether a misfire occurs in the engine.

The driving force control unit and the abnormality determination unit according to the aspect of the invention are configured to execute the following operations.

The driving force control unit is configured to control the engine and the electric motor such that i) the engine being operated at an engine operation point that satisfies an engine required power that is determined on the basis of the user required torque and a vehicle speed of the hybrid vehicle in a first engine operation line that is determined by an output torque of the engine and a rotation speed of the engine and ii) an insufficient torque for the user required torque in a case where the output torque of the engine is transmitted to the drive shaft by the power transmission mechanism is compensated by an output torque of the electric motor.

In addition, the driving force control unit is configured to control the engine and the electric motor such that iii) the engine is operated at an engine operation point that satisfies the engine required power in a second engine operation line that is determined by the output torque of the engine and the rotation speed of the engine in a case where the abnormality determination unit determines that a misfire occurs and fuel is injected from both the in-cylinder injection valve and the port injection valve and iv) an insufficient torque for the user required torque in the case where the output torque of the engine is transmitted to the drive shaft by the power transmission mechanism is compensated by the output torque of the electric motor. Note that the insufficient torque for the user required torque includes the case where the insufficient torque is negative, that is, the case where a torque is excessive for the user required torque. In this case, the electric motor can also function as a generator.

Furthermore, the driving force control unit is configured to cause one of the in-cylinder injection valve and the port injection valve to inject an entire amount of fuel that is supplied to the engine when the engine is operated at the engine operation point in the second engine operation line.

Moreover, when the engine is operated at the engine operation point in the second engine operation line and the entire amount of fuel that is supplied to the engine is injected from the one of the in-cylinder injection valve and the port injection valve, the abnormality determination unit is configured to determine that the one of the in-cylinder injection valve and the port injection valve, which is injecting the entire amount of fuel, is abnormal when the abnormality determination unit determines that a misfire occurs, and to determine that the other one of the in-cylinder injection valve and the port injection valve, which is not injecting the fuel, is abnormal when the abnormality determination unit determines that a misfire does not occur.

Thus, with the hybrid vehicle according to the aspect of the invention, it is possible to determine which one of the in-cylinder injection valve and the port injection valve is abnormal by changing the operating state of the engine to the state where the engine is allowed to operate in one of an in-cylinder injection drive mode and a port injection drive mode while satisfying the user required torque. Thus, it is possible to identify the fuel injection valve that causes a misfire without a feeling of strangeness experienced by the user.

In this case, in the hybrid vehicle according to the aspect of the invention, the driving force control unit may be configured to operate the engine at the engine operation point in the second engine operation line when the hybrid vehicle is travelling in the case where the abnormality determination unit determines that a misfire occurs in a state where fuel is injected from both the in-cylinder injection valve and the port injection valve, and not to operate the engine at the engine operation point in the second engine operation line when the hybrid vehicle is stopped in the case where the abnormality determination unit determines that a misfire occurs in a state where fuel is injected from both the in-cylinder injection valve and the port injection valve.

With this configuration, the hybrid vehicle is able to continue the operation of the engine at the engine operation point in the first engine operation line or stop the operation of the engine when the hybrid vehicle is stopped even when the abnormality determination unit determines that a misfire occurs in a state where fuel is injected from both the in-cylinder injection valve and the port injection valve. Thus, it is possible to improve fuel economy when the hybrid vehicle is stopped and to avoid continuation of the operation of the engine although the hybrid vehicle is stopped, so it is possible to avoid a feeling of strangeness experienced by the user.

In the hybrid vehicle according to the aspect of the invention, the first engine operation line and the second engine operation line may be determined such that i) an efficiency of the engine in the case where the engine is operated at the engine operation point in the first engine operation line while outputting a predetermined engine power is higher than an efficiency of the engine in the case where the engine is operated at the engine operation point in the second engine operation line while outputting the predetermined engine power and ii) a load of the engine in the case where the engine is operated at the engine operation point in the first engine operation line while outputting the predetermined engine power is higher than a load of the engine in the case where the engine is operated at the engine operation point in the second engine operation line while outputting the predetermined engine power.

With this configuration, during normal time (in a state where it is not determined that a misfire occurs), the engine is operated at a high efficiency, so it is possible to improve the fuel economy of the hybrid vehicle.

Note that, in this case, the driving force control unit may be configured to cause the in-cylinder injection valve to inject an entire amount of fuel that is supplied to the engine when the engine is operated at the engine operation point in the second engine operation line.

A second aspect of the invention provides a method for controlling a hybrid vehicle. The hybrid vehicle includes; i) an internal combustion engine including an in-cylinder injection valve and a port injection valve, the in-cylinder injection valve directly injecting fuel into a combustion chamber, and the port injection valve injecting fuel into an intake port that communicates with the combustion chamber; ii) an electric motor; iii) a power transmission mechanism configured to couple a drive shaft of the hybrid vehicle to the engine to transmit torque and to couple the drive shaft to the electric motor to transmit torque; iv) a driving force control unit configured to control the engine and the electric motor such that a torque being determining on the basis of a user's accelerator operation amount is caused to act on the drive shaft, the torque being equal to a user required torque that is required to rotate the drive shaft; v) and an abnormality determination unit configured to determine whether a misfire occurs in the engine.

The control method includes:

controlling the engine and the electric motor such that i) the engine is operated at an engine operation point that satisfies an engine required power that is determined on the basis of the user required torque and a vehicle speed of the hybrid vehicle in a first engine operation line that is determined by an output torque of the engine and a rotation speed of the engine and ii) an insufficient torque for the user required torque in a case where the output torque of the engine is transmitted to the drive shaft by the power transmission mechanism is compensated by an output torque of the electric motor, controlling the engine and the electric motor such that iii) the engine is operated at an engine operation point that satisfies the engine required power in a second engine operation line that is determined by the output torque of the engine and the rotation speed of the engine in a case where the abnormality determination unit determines that a misfire occurs and fuel is injected from both the in-cylinder injection valve and the port injection valve and iv) an insufficient torque for the user required torque in the case where the output torque of the engine is transmitted to the drive shaft by the power transmission mechanism is compensated by the output torque of the electric motor, causing one of the in-cylinder injection valve and the port injection valve to inject an entire amount of fuel that is supplied to the engine when the engine is operated at the engine operation point in the second engine operation line, and when the engine is operated at the engine operation point in the second engine operation line and the entire amount of fuel that is supplied to the engine is injected from the one of the in-cylinder injection valve and the port injection valve, determining that the one of the in-cylinder injection valve and the port injection valve, which is injecting the entire amount of fuel, is abnormal when a misfire occurs, and determining that the other one of the in-cylinder injection valve and the port injection valve, which is not injecting the fuel, is abnormal when a misfire has not occurred.

Other objects, other features and associated advantages of the invention easily become apparent from description of embodiments of the invention described with reference to the following drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic view of a hybrid vehicle according to an embodiment of the invention;

DETAILED DESCRIPTION OF EMBODIMENTS

Figure 2:
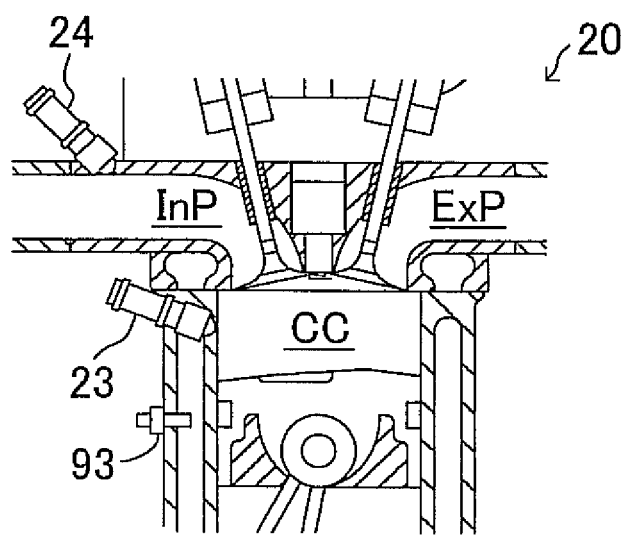
FIG. 2 is a partially cross-sectional view of a specific cylinder of an internal combustion engine shown in FIG. 1.

Hereinafter, a hybrid vehicle according to an embodiment of the invention will be described with reference to the accompanying drawings.
Configuration As shown in FIG. 1, the hybrid vehicle 10 according to the embodiment of the invention includes a motor generator MG1, a motor generator MG2, an internal combustion engine 20, a power distribution mechanism 30, a driving force transmission mechanism 50, a first inverter 61, a second inverter 62, a battery 63, a power management ECU 70, a battery ECU 71, a motor ECU 72 and an engine ECU 73. Note that the word "ECU" is an abbreviation of electronic control unit, and is an electronic control circuit that has a microcomputer as a major component. The microcomputer includes a CPU, a ROM, a RAM, an interface, and the like.

The motor generator MG1 is a synchronous motor generator that is able to function as not only a generator but also an electric motor. The motor generator MG1 is also referred to as the first motor generator MG1 for the sake of convenience. The first motor generator MG1 mainly functions as a generator in the present embodiment. The first motor generator MG1 includes an output shaft (hereinafter, also referred to as "first shaft") 41.

The motor generator MG2, as well as the first motor generator MG1, is a synchronous motor generator that is able to function as not only a generator but also an electric motor. The motor generator MG2 is also referred to as the second motor generator MG2 for the sake of convenience. The second motor generator MG2 mainly functions as an electric motor in the present embodiment. The second motor generator MG2 includes an output shaft (hereinafter, also referred to as "second shaft") 42.

The engine 20 is a four-cycle spark-ignition multi-cylinder internal combustion engine. The engine 20 includes an intake passage unit 21, a throttle valve 22, a throttle valve actuator 22a, a plurality of in-cylinder injection valves 23, a plurality of port injection valves 24, a plurality of ignition devices 25, a crankshaft 26, an exhaust manifold 27, an exhaust pipe 28 and an upstream three-way catalyst 29. The intake passage unit 21 includes an intake pipe and an intake manifold. The plurality of ignition devices 25 each include an ignition plug. The crankshaft 26 is the output shaft of the engine 20. Note that the engine 20 may include a variable intake valve timing control device (VVT) (not shown).

The throttle valve 22 is rotatably supported in the intake passage unit 21. The throttle valve actuator 22a is able to change the passage cross-sectional area of the intake passage unit 21 by rotating the throttle valve 22 in response to an instruction signal from the engine ECU 73.

As shown by an enlarged view in FIG. 2, each of the plurality of in-cylinder injection valves 23 (only one in-cylinder injection valve 23 is shown in FIG. 1 and FIG. 2) is arranged such that the injection hole of each in-cylinder injection valve 23 is exposed in a corresponding one of combustion chambers CC of respective cylinders. Each in-cylinder injection valve 23 is configured to directly inject fuel of an instructed in-cylinder fuel injection amount Fd into a corresponding one of the combustion chambers CC of the respective cylinders on the basis of an in-cylinder fuel injection instruction signal. The instructed in-cylinder fuel injection amount Fd is included in the in-cylinder fuel injection instruction signal. The in-cylinder injection valves 23 each are also called in-cylinder fuel injection valve or direct fuel injection valve.

As shown by an enlarged view in FIG. 2, each of the plurality of port injection valves 24 (only one port injection valve 24 is shown in FIG. 1 and FIG. 2) is arranged such that the injection hole of each port injection valve 24 is exposed in a corresponding one of intake ports InP, which communicates with a corresponding one of the combustion chambers CC of the respective cylinders. Each port injection valve 24 is configured to inject fuel of an instructed port fuel injection amount Fp into the corresponding intake port InP on the basis of a port fuel injection instruction signal. The instructed port fuel injection amount Fp is included in the port fuel injection instruction signal. The port injection valves 24 each are also called port fuel injection valve.

The engine ECU 73 calculates an in-cylinder intake air amount Mc that is taken into one cylinder on the basis of an intake air amount Ga, which is measured by an air flow meter 91, and an engine rotation speed Ne, and determines the amount of fuel (hereinafter, referred to as "total fuel amount Ft") that should be supplied to the engine 20 on the basis of the in-cylinder intake air amount Mc. Furthermore, the engine ECU determines the ratio of the instructed in-cylinder fuel injection amount Fd and the instructed port fuel injection amount Fp on the basis of the operating state of the engine 20, and determines the instructed in-cylinder fuel injection amount Fd and the instructed port fuel injection amount Fp on the basis of the ratio and the total fuel amount Ft.

Each ignition device 25 that includes the ignition plug generates ignition spark in the combustion chamber of a corresponding one of the cylinders at predetermined timing in response to an instruction signal from the engine ECU 73.

The upstream three-way catalyst 29 is an exhaust gas purification catalyst, and is arranged at an exhaust gas collecting portion of the exhaust manifold 27. That is, the catalyst 29 is provided in an exhaust passage of the engine 20. The catalyst 29 purifies unburned substances (HC, CO, and the like) and NOx that are emitted from the engine 20.

The engine 20 is able to change the output torque and engine rotation speed (thus, engine power) of the engine 20 by, for example, changing the intake air amount through changing the opening degree of the throttle valve 22 with the use of the throttle valve actuator 22a and changing the total fuel amount Ft.

The power distribution mechanism 30 includes a known planetary gear unit 31. The planetary gear unit 31 includes a sun gear 32, a plurality of planetary gears 33 and a ring gear 34.

The sun gear 32 is connected to the first shaft 41 of the first motor generator MG1. Thus, the first motor generator MG1 is able to output torque to the sun gear 32. Furthermore, the first motor generator MG1 can be driven for rotation by torque that is input from the sun gear 32 to the first motor generator MG1 (first shaft 41). The first motor generator MG1 is able to generate electric power as the first motor generator MG1 is driven for rotation by torque that is input from the sun gear 32 to the first motor generator MG1.

Each of the plurality of planetary gears 33 is in mesh with the sun gear 32 and is in mesh with the ring gear 34. A rotary shaft (rotation shaft) of each planetary gear 33 is provided on a planetary carrier 35. The planetary carrier 35 is retained so as to be rotatable coaxially with the sun gear 32. Thus, each planetary gear 33 is able to revolve around the sun gear 32 while rotating around its axis. The planetary carrier 35 is connected to the crankshaft 26 of the engine 20. Thus, each planetary gear 33 can be driven for rotation by torque that is input from the crankshaft 26 to the planetary carrier 35.

The ring gear 34 is retained so as to be rotatable coaxially with the sun gear 32.

As described above, each planetary gear 33 is in mesh with the sun gear 32 and the ring gear 34. Thus, when torque is input from the planetary gears 33 to the sun gear 32, the sun gear 32 is driven for rotation by the torque. When torque is input from the planetary gears 33 to the ring gear 34, the ring gear 34 is driven for rotation by the torque. Conversely, when torque is input from the sun gear 32 to the planetary gears 33, the planetary gears 33 are driven for rotation by the torque. When torque is input from the ring gear 34 to the planetary gears 33, the planetary gears 33 are driven for rotation by the torque.

The ring gear 34 is connected to the second shaft 42 of the second motor generator MG2 via a ring gear carrier 36. Thus, the second motor generator MG2 is able to output torque to the ring gear 34. Furthermore, the second motor generator MG2 can be driven for rotation by torque input from the ring gear 34 to the second motor generator MG2 (second shaft 42). Furthermore, the second motor generator MG2 is able to generate electric power as the second motor generator MG2 is driven for rotation by torque input from the ring gear 34 to the second motor generator MG2.

Furthermore, the ring gear 34 is connected to an output gear 37 via the ring gear carrier 36. Thus, the output gear 37 can be driven for rotation by torque input from the ring gear 34 to the output gear 37. The ring gear 34 can be driven for rotation by torque input from the output gear 37 to the ring gear 34.

The driving force transmission mechanism 50 includes a gear train 51, a differential gear 52 and a drive shaft 53.

The gear train 51 couples the output gear 37 to the differential gear 52 by a gear mechanism such that power is transmittable. The differential gear 52 is connected to the drive shaft 53. Drive wheels 54 are respectively connected to both ends of the drive shaft 53. Thus, torque from the output gear 37 is transmitted to the drive wheels 54 via the gear train 51, the differential gear 52 and the drive shaft 53. The hybrid vehicle 10 is able to travel by using the torque transmitted to the drive wheels 54.

The first inverter 61 is electrically connected to the first motor generator MG1 and the battery 63. Thus, when the first motor generator MG1 is generating electric power, electric power generated by the first motor generator MG1 is supplied to the battery 63 via the first inverter 61. Conversely, the first motor generator MG1 is driven for rotation by electric power that is supplied from the battery 63 via the first inverter 61.

The second inverter 62 is electrically connected to the second motor generator MG2 and the battery 63. Thus, the second motor generator MG2 is driven for rotation by electric power that is supplied from the battery 63 via the second inverter 62. Conversely, when the second motor generator MG2 is generating electric power, electric power generated by the second motor generator MG2 is supplied to the battery 63 via the second inverter 62.

Note that it is possible to directly supply electric power, which is generated by the first motor generator MG1, to the second motor generator MG2, and it is possible to directly supply electric power, which is generated by the second motor generator MG2, to the first motor generator MG1.

The battery 63 is a lithium ion battery in the present embodiment. However, the battery 63 just needs to be a chargeable and dischargeable electrical storage device, and may be a nickel metal hydride battery or another secondary battery.

The power management ECU 70 (hereinafter, referred to as "PMECU 70") is connected to the battery ECU 71, the motor ECU 72 and the engine ECU 73 so as to be able to exchange information with them through communication.

The PMECU 70 is connected to a power switch 81, a shift position sensor 82, an accelerator operation amount sensor 83, a brake switch 84, a vehicle speed sensor 85, and the like, and receives output signals that are generated by these sensors.

The power switch 81 is a system start-up switch of the hybrid vehicle 10. The PMECU 70 is configured to start up the system (make the system enter a ready-on state) when a vehicle key (not shown) is inserted into a key slot (not shown) and the power switch 81 is operated while a brake pedal (not shown) is depressed.

The shift position sensor 82 generates a signal that indicates a shift position selected by a shift lever (not shown) that is provided near a user seat of the hybrid vehicle 10 so as to be operational by a user. The shift position includes P (parking position), R (reverse position), N (neutral position) and D (driving position).

The accelerator operation amount sensor 83 generates an output signal that indicates an operation amount (accelerator operation amount AP) of an accelerator pedal (not shown) provided so as to be operational by the user. The accelerator operation amount AP may be referred to as acceleration operation amount. The brake switch 84 generates an output signal that indicates that the brake pedal (not shown) is in an operated state when the brake pedal provided so as to be operational by the user is operated. The vehicle speed sensor 85 generates an output signal that indicates a vehicle speed SPD of the hybrid vehicle 10.

The PMECU 70 receives a remaining level (state of charge) SOC of the battery 63, which is calculated by the battery ECU 71. The remaining level SOC is calculated by a known method on the basis of, for example, an accumulated value of current flowing into or flowing out from the battery 63.

The PMECU 70 receives a signal that indicates a rotation speed of the first motor generator MG1 (hereinafter, referred to as "MG1 rotation speed Nm1") and a signal that indicates a rotation speed of the second motor generator MG2 (hereinafter, referred to as "MG2 rotation speed Nm2") via the motor ECU 72.

Note that the MG1 rotation speed Nm1 is calculated by the motor ECU 72 on the basis of an output value of a resolver 96. The resolver 96 is provided for the first motor generator MG1, and outputs an output value corresponding to a rotation angle of a rotor of the first motor generator MG1. Similarly, the MG2 rotation speed Nm2 is calculated by the motor ECU 72 on the basis of an output value of a resolver 97. The resolver 97 is provided for the second motor generator MG2, and outputs an output value corresponding to a rotation angle of a rotor of the second motor generator MG2.

The PMECU 70 receives various output signals that indicate an engine state via the engine ECU 73. The output signals that indicate an engine state include an engine rotation speed Ne, a throttle valve opening degree TA, an engine coolant temperature THW, and the like.

The motor ECU 72 is connected to the first inverter 61 and the second inverter 62. The motor ECU 72 transmits instruction signals to the first inverter 61 and the second inverter 62 on the basis of commands (MG1 command torque Tm1* and MG2 command torque Tm2*) from the PMECU 70. By so doing, the motor ECU 72 controls the first motor generator MG1 with the use of the first inverter 61, and controls the second motor generator MG2 with the use of the second inverter 62.

The engine ECU 73 is connected to the throttle valve actuator 22a, the in-cylinder injection valves 23, the port injection valves 24, the ignition devices 25, and the like, which serve as engine actuators, and transmits instruction signals to these actuators. Furthermore, the engine ECU 73 is connected to the air flow meter 91, a throttle valve opening degree sensor 92, a coolant temperature sensor 93, an engine rotation speed sensor 94, an air-fuel ratio sensor 95, and the like, and acquires output signals that are generated by these sensors.

The air flow meter 91 measures the amount of air that is taken into the engine 20 per unit time, and outputs a signal that indicates the amount of air (intake air flow rate) Ga. The throttle valve opening degree sensor 92 detects the opening degree of the throttle valve 22 (throttle valve opening degree), and outputs a signal that indicates the detected throttle valve opening degree TA. The coolant temperature sensor 93 detects the temperature of coolant of the engine 20, and outputs a signal that indicates the detected coolant temperature THW.

The engine rotation speed sensor 94 generates a pulse signal each time the crankshaft 26 of the engine 20 rotates a predetermined angle. The engine ECU 73 acquires the engine rotation speed Ne on the basis of the pulse signal. The air-fuel ratio sensor 95 is arranged at the exhaust gas collecting portion of the exhaust manifold 27, and is arranged at a location upstream of the upstream three-way catalyst 29. The air-fuel ratio sensor 95 is a so-called limiting current wide-range air-fuel ratio sensor. The air-fuel ratio sensor 95 detects the air-fuel ratio of exhaust gas, and outputs an output value Vabyfs based on the detected air-fuel ratio abyfs of exhaust gas. The engine ECU 73 acquires the detected air-fuel ratio abyfs by applying the output value Vabyfs to a look-up table Mapabyfs(Vabyfs).

The engine ECU 73 controls the engine 20 by transmitting instruction signals to the throttle valve actuator 22a, the in-cylinder injection valves 23, the port injection valves 24 and the ignition devices 25 (in addition, the variable intake valve timing control device (not shown)) on the basis of signals that are acquired from the above-described sensors, and the like, and commands from the PMECU 70. Note that the engine 20 is provided with a cam position sensor (not shown). The engine ECU 73 acquires a crank angle (absolute crank angle) of the engine 20 with reference to an intake top dead center of a specified cylinder on the basis of signals from the engine rotation speed sensor 94 and the cam position sensor.

Operation: Driving Force Control

Next, the operation of the hybrid vehicle 10 will be described. Note that the process described below is executed by the CPU of the PMECU 70 and the CPU of the engine ECU 73. However, in the following description, for the sake, of simple description, the CPU of the PMECU 70 is referred to as "PM", and the CPU of the engine ECU 73 is referred to as "EG".

During normal operation, the hybrid vehicle causes a torque equal to a user required torque to act on the drive shaft 53 by controlling the output torque of the engine 20 and the output torque of the electric motor (second motor generator MG2) while optimizing the efficiency of the engine 20, that is, while operating the engine 20 at an optimal engine operation point that is an engine operation point in an optimal engine operation line (first engine operation line) (described later). The user required torque is determined on the basis of the user's accelerator operation amount and is required to rotate the drive shaft 53 of the vehicle.

The hybrid vehicle actually controls the engine 20, the first motor generator MG1 and the second motor generator MG2 in association with one another. The base of the control is, for example, described in detail in Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed on Mar. 10, 1997), and the like. These are incorporated into the specification of the present application by reference.

Figure 3:
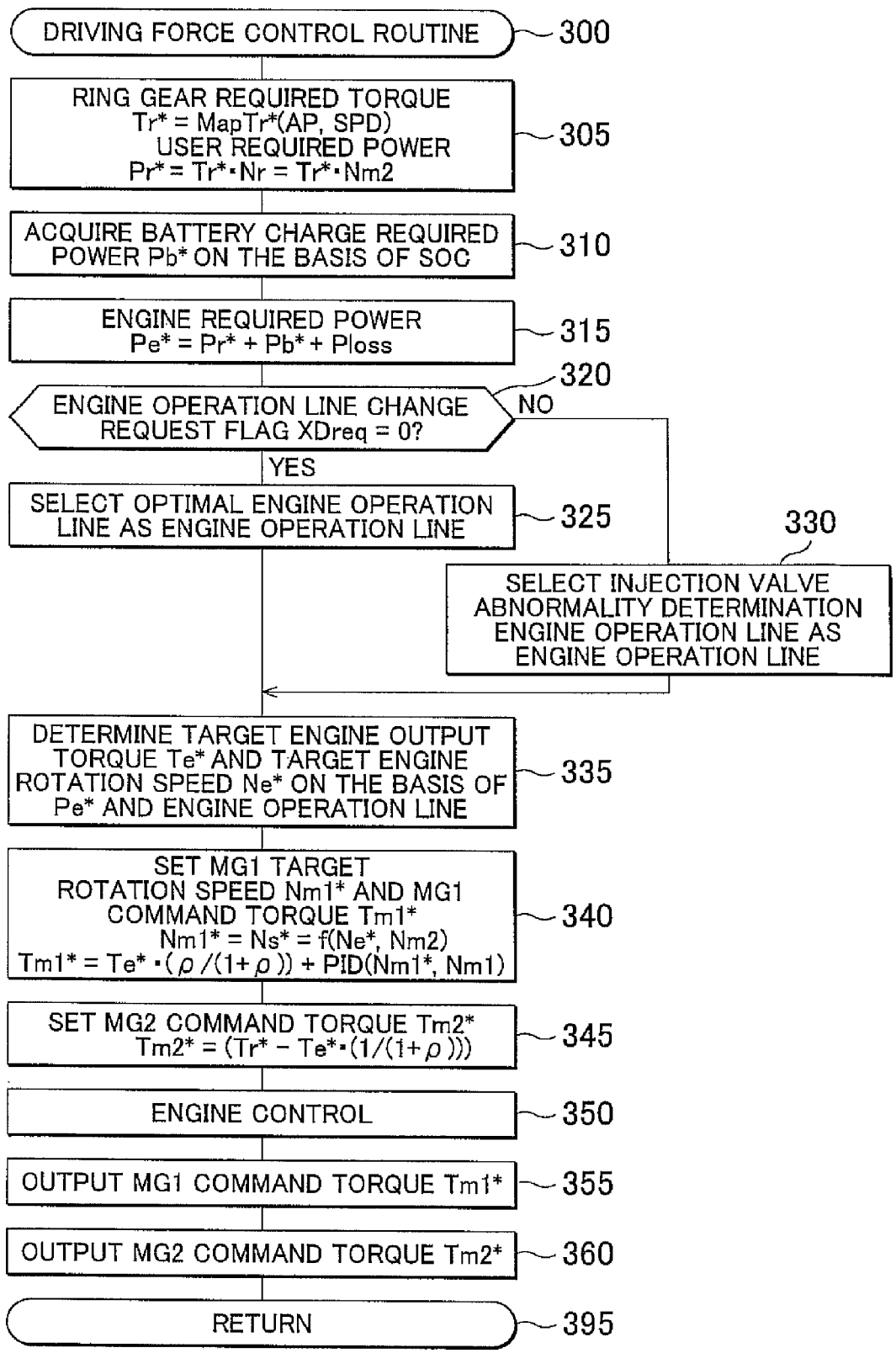
FIG. 3 is a flowchart that shows a routine that is executed by a CPU of a power management ECU shown in FIG. 1.

When the shift position is the driving position, the PM executes a driving force control routine shown by the flowchart in FIG. 3 each time a predetermined period of time has elapsed. Thus, at predetermined timing, the PM starts the process from step 300 in FIG. 3, sequentially executes the processes of step 305, step 310 and step 315, and then proceeds with the process to step 320.

In step 305, the PM acquires a ring gear required torque Tr* corresponding to a user required torque Tu* on the basis of the accelerator operation amount AP and the vehicle speed SPD. The user required torque Tu* is a torque that is required to rotate the drive shaft 53 and that is determined on the basis of the user's accelerator operation amount AP. Furthermore, the PM determines a user required power Pr*.

Figure 4:
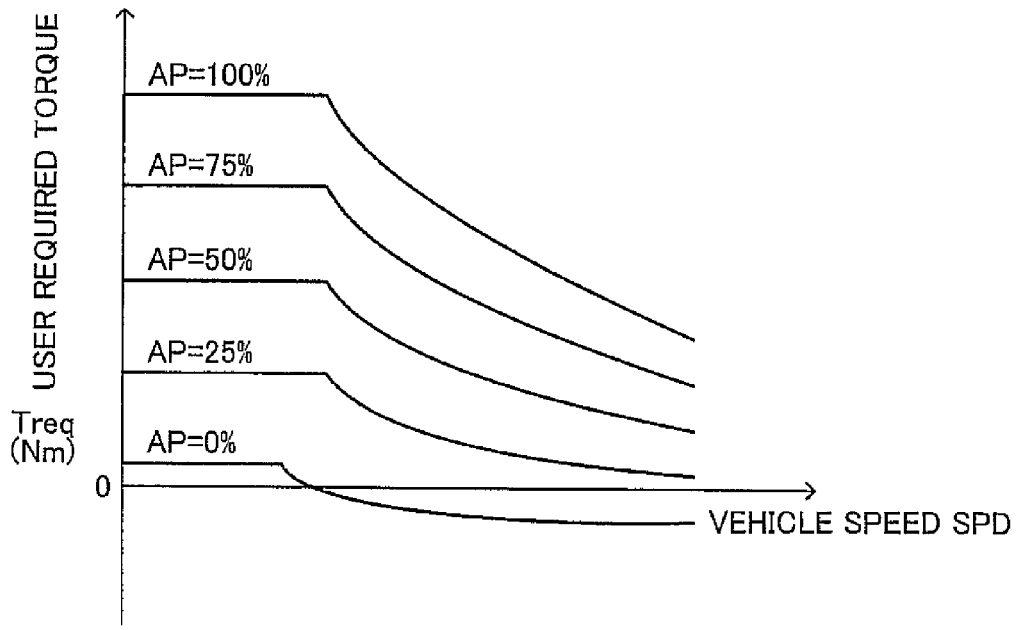
FIG. 4 is a graph that shows the correlation among an accelerator operation amount, a vehicle speed and a user required torque.

More specifically, a torque that acts on the drive shaft 53 (drive shaft torque) and a torque that acts on the rotary shaft of the ring gear 34 are directly proportional to each other. Thus, the user required torque Tu* that is required by the user for the hybrid vehicle 10 to travel and the ring gear required torque Tr* are directly proportional to each other. The PM stores a table that includes data converted from the correlation among the accelerator operation amount AP, the vehicle speed SPD and the user required torque Tu*, shown in FIG. 4, to the correlation among the accelerator operation amount AP, the vehicle speed SPD and the ring gear required torque Tr* in the ROM as a torque map MapTr*(AP, SPD). The PM acquires the ring gear required torque Tr* by applying the current accelerator operation amount AP and the current vehicle speed SPD to the torque map MapTr*(AP, SPD).

On the other hand, a power required to rotate the drive shaft 53 is equal to the product (Tu*·SPD) of the user required torque Tu* and the actual vehicle speed SPD. The product (Tu*·SPD) is equal to the product (Tr*·Nr) of the ring gear required torque Tr* and the rotation speed Nr of the ring gear 34. Thus, hereinafter, the product (Tr*·Nr) is referred to as user required power Pr*. That is, the user required power Pr* is determined by the user required torque Tu*. Furthermore, specifically, the user required power Pr* is determined on the basis of a value that is directly proportional to the product (Tu*·SPD) of the user required torque Tu* and the vehicle speed SPD.

In the present embodiment, the ring gear 34 is connected to the second shaft 42 of the second motor generator MG2 without intervening a speed reducer. Therefore, the rotation speed Nr of the ring gear 34 is equal to the second MG rotation speed Nm2. Thus, the user required power Pr* is equal to the product (Tr*·Nm2) of the ring gear required torque Tr* and the second MG rotation speed Nm2.

If the ring gear 34 is coupled to the second shaft 42 via a speed reduction gear, the rotation speed Nr of the ring gear 34 is equal to a value (Nm2/Gr) obtained by dividing the second MG rotation speed Nm2 by the gear ratio Gr of the speed reduction gear. In this case, the user required power Pr* is calculated as a value (Tr*·Nm2/Gr).

In step 310, the PM acquires a battery charge required power Pb* on the basis of the remaining level SOC. The battery charge required power Pb* is a value corresponding to an electric power that should be supplied to the battery 63 in order to charge the battery 63. The battery charge required power Pb* is calculated as "0" when the remaining level SOC is higher than or equal to a predetermined value SOCLoth, and is calculated so as to increase as the remaining level SOC reduces when the remaining level SOC is lower than the predetermined value SOCLoth.

In step 315, the PM acquires a value (Pr*+Pb*+Ploss) obtained by adding a loss Ploss to the sum of the user required power Pr* and the battery charge required power Pb* as an engine required power Pe*. The engine required power Pe* is a power that is required for the engine 20.

Subsequently, the PM proceeds with the process to step 320, and determines whether the value of an engine operation line change request flag XDreq (hereinafter, also simply referred to as "change request flag XDreq") is "0". The value of the change request flag XDreq is changed in step 890 of FIG. 8 and step 1080 of FIG. 10 (described later). In short, the value of the change request flag XDreq is set to "1" when a misfire has been detected in the engine 20 and it is required to determine whether the in-cylinder injection valves 23 cause the misfire or the port injection valves 24 cause the misfire; otherwise, the value of the change request flag XDreq is set to "0".

Furthermore, the value of the change request flag XDreq is set to "0" in an initial routine that is executed at the time when the system is started up (the system is caused to enter a ready-on state).

Case 1

This is the case where the value of the change request flag XDreq is "0".

Figure 5:
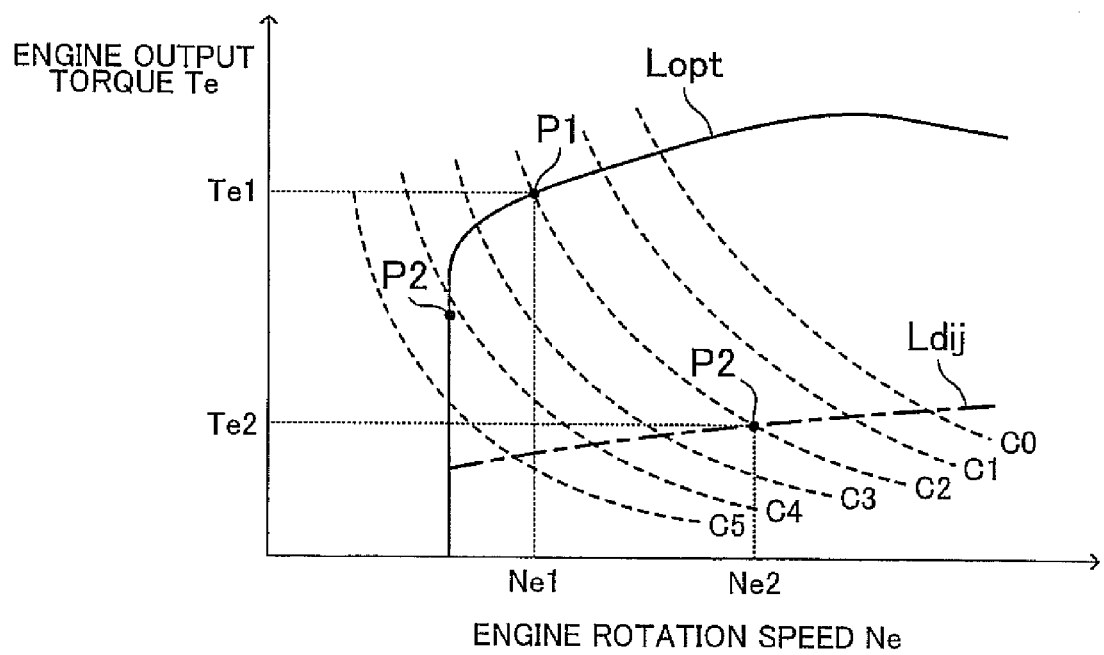
FIG. 5 is a graph that shows the correlation among an engine rotation speed, an engine output torque, an optimal engine operation line (first engine operation line) and an injection valve abnormality determination engine operation line (second engine operation line)

In this case, the PM makes affirmative determination in step 320 and proceeds with the process to step 325, and then selects an optimal engine operation line Lopt indicated by the solid line in FIG. 5 as the engine operation line. The optimal engine operation line Lopt is also referred to as first engine operation line for the sake of convenience.

Incidentally, an engine operation point at which the operation efficiency (fuel economy) of the engine is the highest when a power is output from the crankshaft 26 is obtained in advance as an optimal engine operation point for each power through an experiment, or the like. A line formed by connecting these optimal engine operation points plotted on a graph defined by the engine output torque Te and the engine rotation speed Ne is the optimal engine operation line Lopt indicated by the solid line in FIG. 5. In FIG. 5, each of a plurality of lines C0 to C5 indicated by the broken lines is a line (constant power line) that connects engine operation points at which it is possible to output the same power from the crankshaft 26.

Subsequently, the PM sequentially executes the processes of step 335 to step 360 that will be described below. After that, the PM proceeds with the process to step 395, and once ends the routine.

In step 335, the PM determines a target engine output torque Te* and a target engine rotation speed Ne* on the basis of the engine operation point corresponding to the engine required power Pe*. More specifically, the PM searches for the engine operation point at which it is possible to obtain a power equal to the engine required power Pe* in the currently selected engine operation line (at this time point, the optimal engine operation line Lopt indicated by the solid line in FIG. 5), and determines the engine output torque Te and the engine rotation speed Ne corresponding to the found engine operation point as the target engine output torque Te* and the target engine rotation speed Ne*, respectively. Note that the engine operation point in the optimal engine operation line Lopt is also termed optimal engine operation point.

For example, when the engine required power Pe* is equal to a power corresponding to the line C2 in FIG. 5, an engine output torque Te1 at an intersection P1 of the line C2 and the optimal engine operation line Lopt indicated by the solid line is determined as the target engine output torque Te*, and an engine rotation speed Ne at the intersection P1 is determined as the target engine rotation speed Ne*.

In step 340, the PM substitutes the second MG rotation speed Nm2 equal to the rotation speed Nr into the following mathematical expression (1) as the rotation speed Nr of the ring gear 34, substitutes the target engine rotation speed Ne* into the following mathematical expression (1) as the engine rotation speed Ne, and then calculates an MG1 target rotation speed Nm1* equal to a target rotation speed Ns* of the sun gear 32.

$$Ns=Nm1=Nr-(Nr-Ne)\cdot(1+\rho)/\rho \quad (1)$$

In the above mathematical expression (1), "ρ" is a value that is defined by the following mathematical expression (2). That is, "ρ" is the number of teeth of the sun gear 32 with respect to the number of teeth of the ring gear 34.

$$\rho = \text{(the number of teeth of the sun gear 32/the number of teeth of the ring gear 34)} \quad (2)$$

Here, the grounds for the above-described mathematical expression (1) will be described. The relationship among rotation speeds of the gears in the planetary gear unit 31 is shown by a known nomograph shown in FIG. 6. The line shown in the nomograph is referred to as an operation collinear L. As is understood from the nomograph, the ratio (=(Ne−Ns)/(Nr−Ns)) of the difference (Ne−Ns) between the engine rotation speed Ne and the rotation speed Ns of the sun gear 32 with respect to the difference (Nr−Ns) between the rotation speed Nr of the ring gear 34 and the rotation speed Ns of the sun gear 32 is equal to the ratio (=1/(1+ρ)) of 1 with respect to a value (1+ρ). The above-described mathematical expression (1) is derived on the basis of this proportional relationship.

In step 340, the PM calculates the MG1 command torque Tm1* that is a torque that should be output from the first motor generator MG1 in accordance with the following mathematical expression (3). In the mathematical expression (3), a value PID(Nm1*−Nm1) is a feedback amount corresponding to a difference between the MG1 target rotation speed Nm1* and the actual rotation speed Nm1 of the first motor generator MG1. That is, the value PID(Nm1*−Nm1) is a feedback amount for bringing the actual rotation speed Nm1 of the first motor generator MG1 into coincidence with the MG1 target rotation speed Nm1*.

$$Tm1^* = Te^* \cdot (\rho/(1+\rho)) + PID(Nm1^* - Nm1) \quad (3)$$

Here, the grounds for the above mathematical expression (3) will be described. When a torque equal to the target engine output torque Te* is generated in the crankshaft 26 (that is, the engine output torque is Te*), the engine output torque Te* is converted by the planetary gear unit 31. As a result, a torque Tes expressed by the following mathematical expression (4) acts on the rotary shaft of the sun gear 32, and a torque Ter expressed by the following mathematical expression (5) acts on the rotary shaft of the ring gear 34.

$$Tes = Te^* \cdot (\rho/(1+\rho)) \quad (4)$$

$$Ter = Te^* \cdot (1/(1+\rho)) \quad (5)$$

Figure 6:
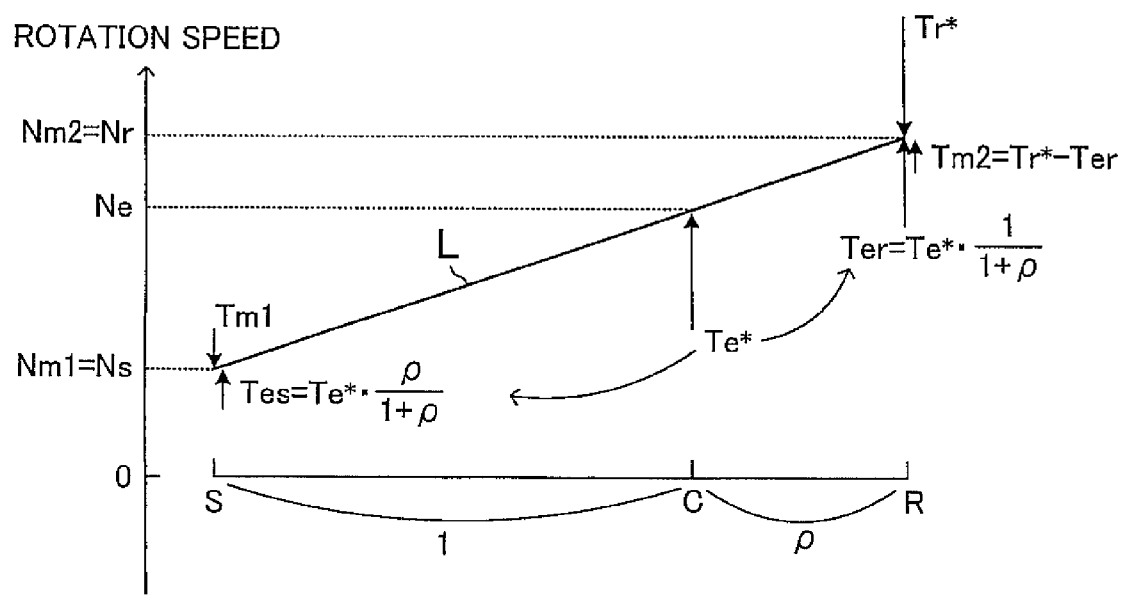
FIG. 6 is a nomograph of a planetary gear unit while the hybrid vehicle shown in FIG. 1 is travelling.

The balance of force of the operation collinear just needs to be kept in order to stabilize the operation collinear. Thus, as shown in FIG. 6, the torque Tm1 having the same magnitude as the torque Tes and an opposite direction to the direction of the torque Tes, obtained from the above-described mathematical expression (4), just needs to be caused to act on the rotary shaft of the sun gear 32, and the torque Tm2 expressed by the following mathematical expression (6) just needs to be caused to act on the rotary shaft of the ring gear 34. That is, the torque Tm2 is equal to an insufficient amount of the torque Ter with respect to the ring gear required torque Tr*. The torque Tm2 is employed as the MG2 command torque Tm2*.

$$Tm2 = Tr^* - Ter \quad (6)$$

When the sun gear 32 rotates at the target rotation speed Ns* (that is, when the actual rotation speed Nm1 of the first motor generator MG1 coincides with the MG1 target rotation speed Nm1*), the engine rotation speed Ne coincides with the target engine rotation speed Ne*. From above, the MG1 command torque Tm1* is obtained by the above-described mathematical expression (3).

In step 345, the PM calculates the MG2 command torque Tm2* that is a torque that should be output from the second motor generator MG2 in accordance with the above-described mathematical expression (5) and the above-described mathematical expression (6). Note that the PM may determine the MG2 command torque Tm2* on the basis of the following mathematical expression (7).

$$Tm2^* = Tr^* - Tm1^*/\rho \quad (7)$$

In step 350, the PM transmits a command signal to the EG such that the engine 20 is operated at the engine operation point found in step 335 (in other words, the engine output torque becomes the target engine output torque Te*). Thus, the EG changes the opening degree of the throttle valve 22 by driving the throttle valve actuator 22a, changes the total fuel amount Ft, and controls the engine 20 such that the engine output torque Te becomes the target engine output torque Te*.

In step 355, the PM transmits the MG1 command torque Tm1* to the motor ECU 72. The motor ECU 72 controls the first inverter 61 such that the output torque of the first motor generator MG1 coincides with the MG1 command torque Tm1*. In step 360, the PM transmits the MG2 command torque Tm2* to the motor ECU 72. The motor ECU 72 controls the second inverter 62 such that the output torque of the second motor generator MG2 coincides with the MG2 command torque Tm2*.

Through the above processes, the torque equal to the ring gear required torque Tr* is caused to act on the ring gear 34 by the engine 20 and the second motor generator MG2. When the remaining level SOC is lower than the predetermined value SOCLoth, a power generated by the engine 20 is increased by the battery charge required power Pb*. Thus, the torque Ter increases, so, as is understood from the above-described mathematical expression (6), the MG2 command torque Tm2* reduces. As a result, an electric power that is consumed in the second motor generator MG2 within an electric power that is generated by the first motor generator MG1 reduces, so the battery 63 is charged with a redundant electric power (electric power that is not consumed by the second motor generator MG2) that is generated by the first motor generator MG1.

Case 2

This is the case where the value of the change request flag XDreq is "1".

In Case 2, when the PM proceeds with the process to step 320, the PM makes negative determination in step 320 and then proceeds with the process to step 330, and selects an engine operation line Ldij indicated by the alternate long and short dash line in FIG. 5 as the engine operation line. The engine operation line Ldij is also termed second engine operation line or injection valve abnormality determination engine operation line. The engine operation line Ldij is formed by connecting engine operation points within a range in which the load of the engine is a relatively light load and the entire amount of fuel that is supplied to the engine 20 is allowed to be injected from the in-cylinder injection valves 23. As a result, the efficiency of the engine 20 in the case where the engine 20 outputs a certain power at a selected engine operation point in the engine operation line Ldij is lower than the efficiency of the engine 20 in the case where the engine 20 outputs the certain power at an engine operation point in the optimal engine operation line Lopt (that is, the optimal engine operation point).

Note that the PM may proceed with the process to step 330 only when the value of the change request flag XDreq is "1" and the vehicle speed SPD is higher than "0" (while the hybrid vehicle 10 is travelling) in step 320; otherwise, the PM may proceed with the process to step 325.

After that, the PM executes the above-described processes of step 335 to step 360. Thus, in step 335, the PM searches for an engine operation point, at which a power equal to the engine required power Pe* is obtained, in the currently selected engine operation line (at this time point, the engine operation line Ldij indicated by the alternate long and short dash line in FIG. 5), and determines the engine output torque Te and the engine rotation speed Ne corresponding to the found engine operation point as the target engine output torque Te* and the target engine rotation speed Ne*, respectively.

For example, when the engine required power Pe* is equal to a power corresponding to the line C2 in FIG. 5, an engine output torque Te2 at an intersection P2 of the line C2 and the engine operation line Ldij indicated by the alternate long and short dash line is determined as the target engine output torque Te*, and an engine rotation speed Ne2 at the intersection P2 is determined as the target engine rotation speed Ne*. Note that an engine operation point in the engine operation line Ldij is also termed misfire cause determination engine operation point.

After that, the PM determines the MG1 command torque Tm1* and the MG2 command torque TM2* in step 340 and step 345, and controls the engine 20 in step 350 such that the engine 20 outputs the target engine output torque Te*. Subsequently, the PM outputs the MG1 command torque Tm1* to the motor ECU 72 in step 355, and outputs the MG2 command torque TM2* to the motor ECU 72 in step 360.

Operation: Fuel Injection Amount Control Over Engine

Next, fuel injection amount control over the engine will be simply described. The EG executes a fuel injection control routine shown by the flowchart in FIG. 7 each time a predetermined period of time has elapsed. As described above, the EG receives the target engine output torque Te* from the PM, and controls the throttle valve actuator 22a, and the like, such that a torque equal to the target engine output torque Te* is generated by the engine 20.

Figure 7:
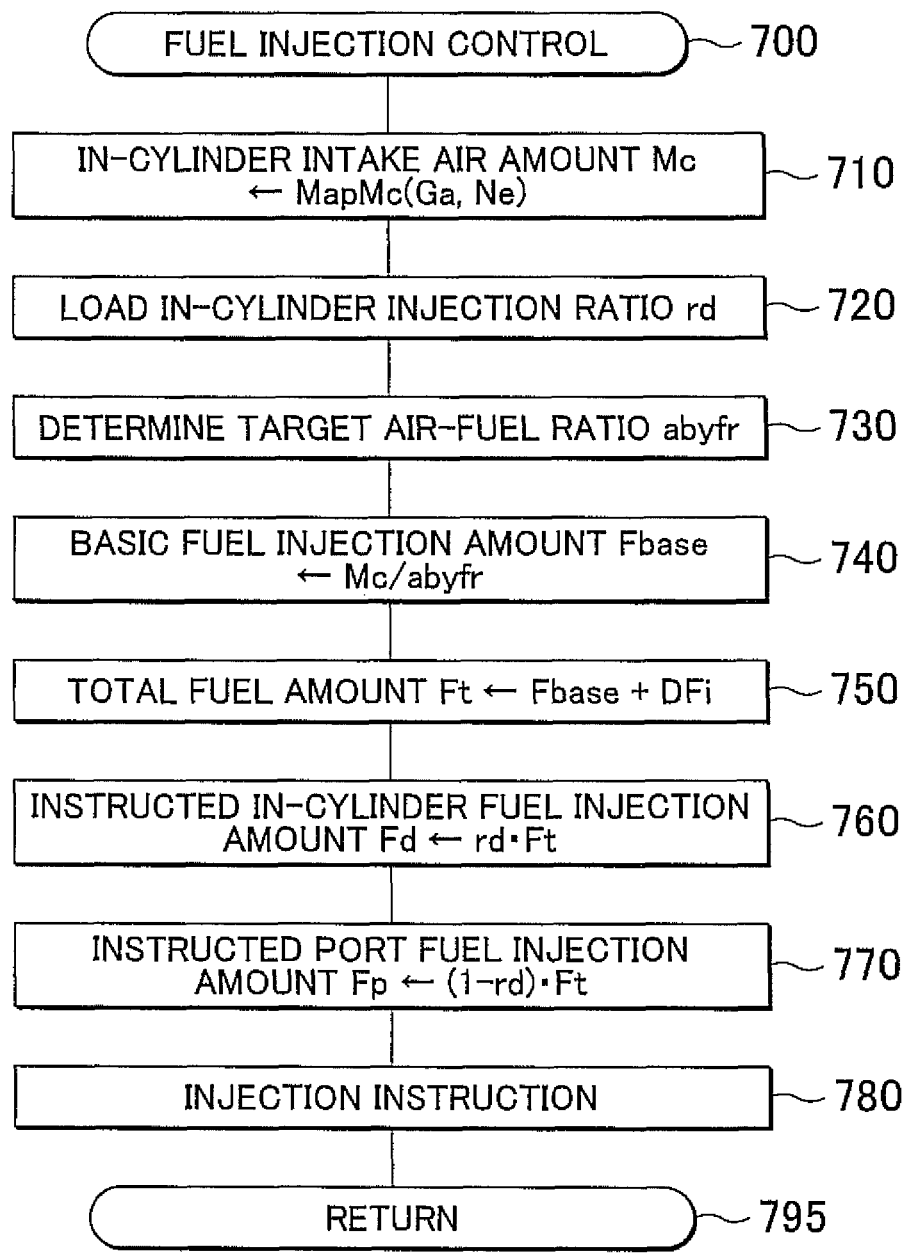
FIG. 7 is a flowchart that shows a routine that is executed by a CPU of an engine ECU shown in FIG. 1.

At predetermined timing, the EG starts the process from step 700 in FIG. 7, and sequentially executes the processes of step 710 to step 780 that will be described below, after which the EG proceeds with the process to step 795 and once ends the routine.

In step 710, the EG acquires the amount of air (that is, the in-cylinder intake air amount) Mc that the cylinder that performs intake stroke next takes in through one intake stroke on the basis of the intake air amount Ga and the engine rotation speed Ne. At this time, the EG uses a table MapMc(Ga, Ne). In step 720, the EG loads an in-cylinder injection ratio (direct injection ratio) rd that is separately determined by a routine shown in FIG. 10. The in-cylinder injection ratio rd is the ratio of the amount of fuel that should be injected from the in-cylinder injection valves 23 (instructed in-cylinder fuel injection amount Fd) with respect to the total amount of fuel that is injected (supplied) to the engine 20 (total fuel amount Ft). In step 730, the EG determines a target air-fuel ratio abyfr. The target air-fuel ratio abyfr is set to a stoichiometric air-fuel ratio stoich in cases other than a special case, for example, after an engine start or when the engine is cold.

In step 740, the EG calculates a basic fuel injection amount Fbase by dividing the in-cylinder intake air amount Mc by the target air-fuel ratio abyfr. In step 750, the EG calculates a total fuel amount Ft by multiplying the basic fuel injection amount Fbase by an air-fuel ratio feedback amount KFi. The air-fuel ratio feedback amount KFi is a correction amount for bringing the detected air-fuel ratio abyfs into coincidence with the stoichiometric air-fuel ratio stoich, and is separately calculated by a routine (not shown). The air-fuel ratio feedback amount is reduced when the detected air-fuel ratio abyfs is smaller than the stoichiometric air-fuel ratio stoich, and is increased as the detected air-fuel ratio abyfs is larger than the stoichiometric air-fuel ratio stoich. A basic value of the air-fuel ratio feedback amount KFi (a value that neither increases nor reduces the basic fuel injection amount Fbase) is "1".

In step 760, the EG determines the instructed in-cylinder fuel injection amount Fd by multiplying the total fuel amount Ft by the in-cylinder injection ratio rd. In step 770, the EG determines the instructed port fuel injection amount Fp by multiplying the total fuel amount Ft by a value (1−rd). In step 780, the EG transmits an instruction signal to the port injection valve 24 corresponding to the cylinder that performs intake stroke such that fuel of the instructed port fuel injection amount Fp is injected from the port injection valve 24 at predetermined timing. Furthermore, the EG transmits an instruction signal to the in-cylinder injection valve 23 of that cylinder such that fuel of the instructed in-cylinder fuel injection amount Fd is injected from the in-cylinder injection valve 23 at predetermined timing.

Operation: First Misfire Abnormality Determination

Next, the operation of the EG at the time when first misfire abnormality determination is carried out will be described. The EG executes a first misfire abnormality determination routine shown by the flowchart in FIG. 8 each time a predetermined period of time has elapsed.

Figure 8:
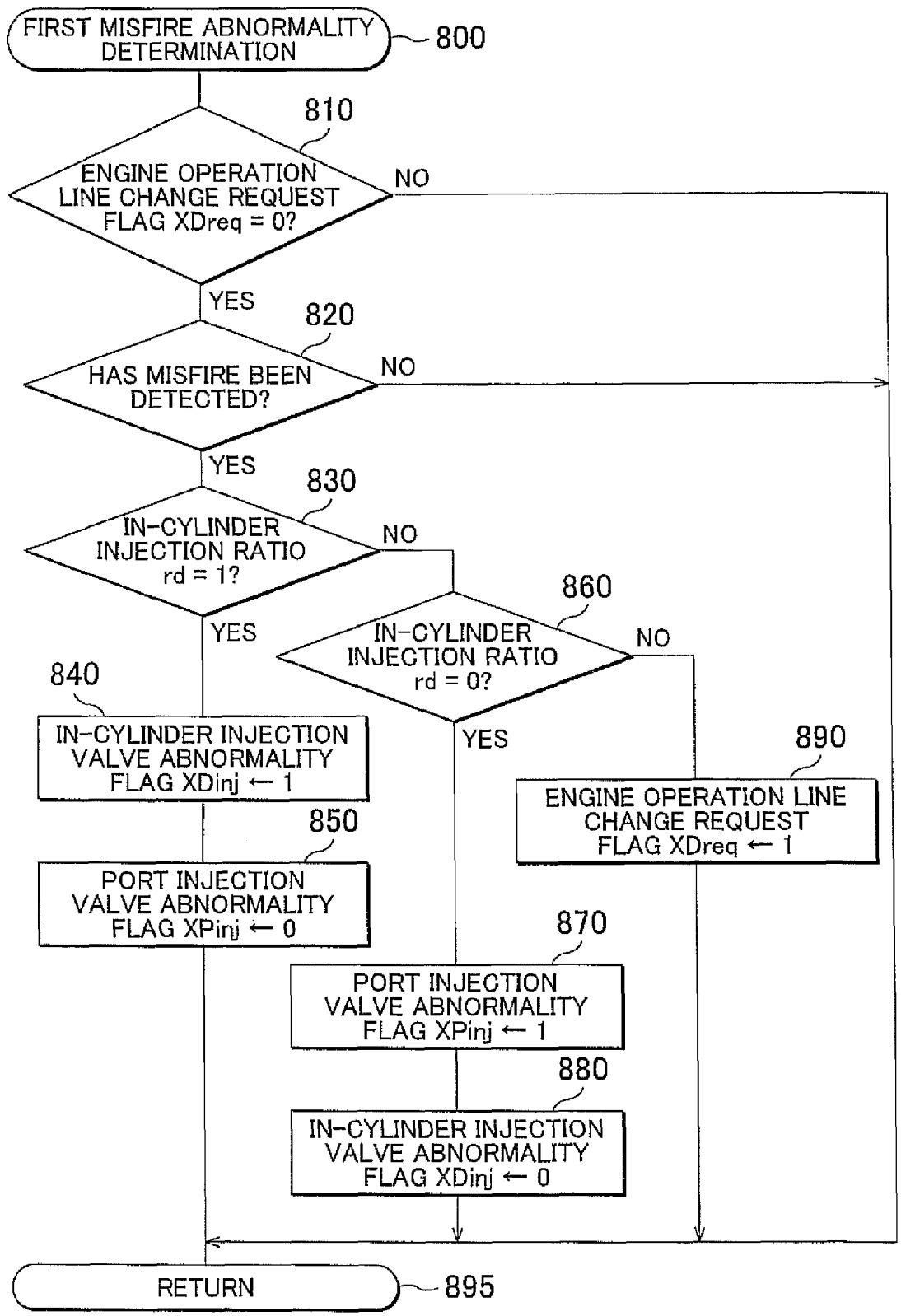
FIG. 8 is a flowchart that shows a routine that is executed by the CPU of the engine ECU shown in FIG. 1.

Thus, at predetermined timing, the EG starts the process from step 800 in FIG. 8 and proceeds with the process to step 810, and then determines whether the value of the engine operation line change request flag XDreq is "0".

Now, it is assumed that the value of the change request flag XDreq is "0". In this case, the EG makes affirmative determination in step 810 and proceeds with the process to step 820, and then determines whether a misfire has been detected in a period from the time point a predetermined period of time before the current time point to the current time point.

More specifically, the EG constantly measures a period of time T30 that is required for the crankshaft 26 to rotate a predetermined crank angle (in the present embodiment, 30°). The period of time T30 is inversely proportional to the rotation speed of the crankshaft 26.

Figure 9:
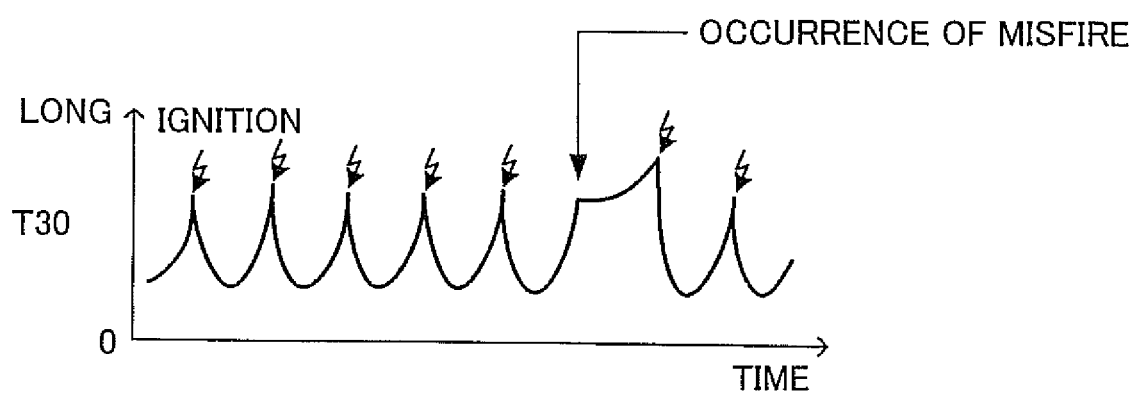
FIG. 9 is a time chart for illustrating a misfire detection method.

Incidentally, as shown in FIG. 9, when ignition is performed by any one of the ignition devices 25, the corresponding piston is rapidly pushed down through explosion of air-fuel mixture, so the rotation speed of the crankshaft 26 steeply increases. Thus, immediately after sir-fuel mixture is normally ignited, the period of time T30 steeply reduces. After that, the rotation speed of the crankshaft 26 gradually decreases due to a pumping loss, a friction, and the like. Thus, the period of time T30 shifts from reduction to increase. As a result, when ignition is normally performed in each cylinder, the period of time T30 shows a waveform that oscillates with substantially the same amplitude at substantially the same period.

However, when a misfire occurs and air-fuel mixture does not explode, the rotation speed of the crankshaft 26 does not increase and continues to reduce. Then, the EG acquires the period of time T30 through a misfire detection routine (not shown) each time the crank angle changes by 30°, and determines whether a misfire has occurred by monitoring fluctuations in the period of time T30 (for example, see Japanese Patent Application Publication No. 2011-26961 (JP 2011-26961 A)). Note that a method of determining whether a misfire has occurred is not limited to the above method; various known methods may be employed.

When no misfire has been detected, the EG makes negative determination in step 820 and directly proceeds with the process to step 895, after which the EG once ends the routine. In contrast to this, when a misfire has been detected, the EG makes affirmative determination in step 820 and proceeds with the process to step 830, and then determines whether the in-cylinder injection ratio rd at the current time point is "1". When the in-cylinder injection ratio rd at the current time point is "1", the detected misfire may be determined as a misfire due to the in-cylinder injection valves 23.

When the in-cylinder injection ratio rd at the current time point is "1", the EG makes affirmative determination in step 830 and proceeds with the process to step 840, and then sets an in-cylinder injection valve abnormality flag XDinj to "1". The value of the in-cylinder injection valve abnormality flag XDinj is stored in the backup RAM of the engine ECU 73. That is, the EG determines that there is a misfire abnormality in the in-cylinder injection valves 23. Furthermore, the EG proceeds with the process to step 850, and sets a port injection valve abnormality flag XPinj to "0". The value of the port injection valve abnormality flag XPinj is also stored in the backup RAM of the engine ECU 73. That is, the EG determines that there is no misfire abnormality in the port injection valves 24. After that, the EG proceeds with the process to step 895 and once ends the routine.

On the other hand, when the in-cylinder injection ratio rd is not "1" at the time point at which the EG executes the process of step 830, the EG makes negative determination in step 830 and proceeds with the process to step 860, and then determines whether the in-cylinder injection ratio rd is "0" at that time point. When the in-cylinder injection ratio rd at the current time point is "0", the detected misfire may be determined as a misfire due to the port injection valves 24.

When the in-cylinder injection ratio rd is "0", the EG makes affirmative determination in step 860 and proceeds with the process to step 870, and then sets the value of the port injection valve abnormality flag XPinj to "1". That is, the EG determines that there is a misfire abnormality in the port injection valves 24. Furthermore, the EG proceeds with the process to step 880, and sets the in-cylinder injection valve abnormality flag XDinj to "0". That is, the EG determines that there is no misfire abnormality in the in-cylinder injection valves 23. After that, the EG proceeds with the process to step 895 and once ends the routine.

In contrast to this, when the in-cylinder injection ratio rd is not "0" at the time point at which the EG executes the process of step 860, a misfire has been detected in a state where fuel is injected from both the set of in-cylinder injection valves 23 and the set of port injection valves 24, so it is not possible to determine which one of the set of in-cylinder injection valves 23 and the set of port injection valves 24 causes a misfire. The EG makes negative determination in step 860 and proceeds with the process to step 890, and then sets the value of the engine operation line change request flag XDreq to "1". After that, the EG proceeds with the process to step 895, and once ends the routine. As a result, the PM proceeds with the process from step 320 to step 330 in FIG. 3, so the second engine operation line (injection valve abnormality determination engine operation line) is selected as the engine operation line.

Operation: Second Misfire Abnormality Determination

Next, the operation of the EG at the time when second misfire abnormality determination is carried out will be described. The EG executes a second misfire abnormality determination routine shown by the flowchart in FIG. 10 each time a predetermined period of time has elapsed. Through this routine, it is determined which one of the set of in-cylinder injection valves 23 and the set of port injection valves 24 causes a misfire, and the in-cylinder injection ratio rd is determined.

Figure 10:
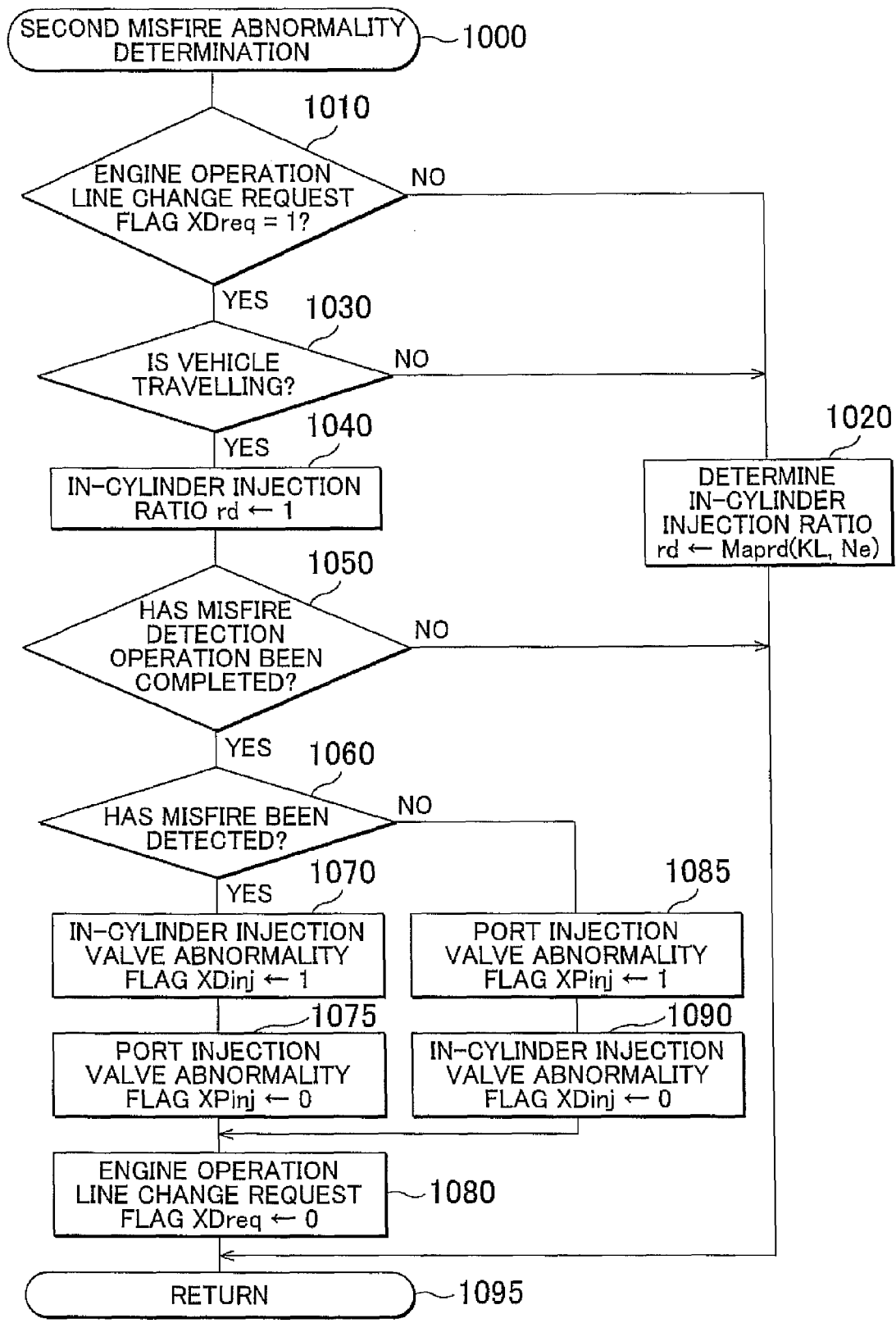
FIG. 10 is a flowchart that shows a routine that is executed by the CPU of the engine ECU shown in FIG. 1.

At predetermined timing, the EG starts the process from step 1000 in FIG. 10 and proceeds with the process to step 1010, and then determines whether the value of the engine operation line change request flag XDreq is "1". The value of the change request flag XDreq is set to "0" in the initial routine as described above. Furthermore, the value of the change request flag XDreq is set to "1" in step 890 in FIG. 8.

Thus, normally, the value of the change request flag XDreq is set at "0". In this case, the EG makes negative determination in step 1010 and proceeds with the process to step 1020, and then determines the in-cylinder injection ratio rd on the basis of a load KL and the engine rotation speed Ne. More specifically, the EG determines the in-cylinder injection ratio rd by applying the load KL and the engine rotation speed Ne to a look-up table Maprd(KL, NE). According to the table Maprd(KL, NE), normally, the in-cylinder injection ratio rd is set to a value that is larger than "0" and smaller than "1". That is, during normal operation, fuel is supplied to the engine 20 from both the set of in-cylinder injection valves 23 and the set of port injection valves 24. After that, the EG directly proceeds with the process to step 1095 and once ends the routine.

Note that the load KL is calculated by the following mathematical expression (8).

$$KL=(Mc/(\rho air \cdot L/4)) \cdot 100\% \qquad (8)$$

In the mathematical expression (8), Mc is an in-cylinder intake air amount, ρair is an air density (unit: L is a displacement of the engine 20 (unit: l), and "4" is the number of cylinders of the engine 20. Note that the throttle valve opening degree TA may be used as the load KL.

On the other hand, when the EG proceeds with the process to step 1010 in FIG. 10 after the value of the change request flag XDreq is set to "1" in step 890 in FIG. 8, the EG makes affirmative determination in step 1010 and proceeds with the process to step 1030, and then determines whether the hybrid vehicle 10 is travelling. That is, the EG determines whether the vehicle speed SPD is higher than "0". When the hybrid vehicle 10 is not travelling, the EG makes negative determination in step 1030 and proceeds with the process to step 1020, after which the EG proceeds with the process to step 1095 and once ends the routine. Note that, when the EG makes negative determination in step 1030, the EG may stop the operation of the engine 20 by stopping fuel injection to the engine 20.

After the EG proceeds with the process to step 1030 in FIG. 10, when the hybrid vehicle 10 is travelling, the EG makes affirmative determination in step 1030, and then proceeds with the process to step 1040. In step 1040, the EG sets the in-cylinder injection ratio rd to "1". As a result, the entire amount of fuel that is supplied to the engine 20 is supplied from the in-cylinder injection valves 23 (see step 750 to step 770 in FIG. 7).

Subsequently, the CPU proceeds with the process to step 1050, and changes the value of the change request flag XDreq to "1". By so doing, the CPU determines whether a sufficient period of time for detecting a misfire has elapsed from the time point at which the in-cylinder injection ratio rd is changed to "1" (hereinafter, also referred to as "abnormality determination injection ratio change time point"). That is, the EG determines whether the misfire detection operation has been completed. When the misfire detection operation has not been completed, the EG makes negative determination in step 1050, directly proceeds with the process to step 1095, and once ends the routine.

In contrast to this, when the misfire detection operation has been completed after the abnormality determination injection ratio change time point, the EG makes affirmative determination in step 1050 and proceeds with the process to step 1060. In step 1060, the EG determines whether a misfire has been detected after the abnormality determination injection ratio change time point.

At the current time point, the value of the in-cylinder injection ratio rd is set at "1". Thus, when a misfire has been detected after the abnormality determination injection ratio change time point, it may be determined that there is a misfire abnormality in the in-cylinder injection valves 23.

When a misfire has been detected after the abnormality determination injection ratio change time point, the EG makes affirmative determination in step 1060 and proceeds with the process to step 1070, and then sets the value of the in-cylinder injection valve abnormality flag XDinj to "1". That is, the EG determines that there is a misfire abnormality in the in-cylinder injection valves 23. Furthermore, the EG proceeds with the process to step 1075, and sets the value of the port injection valve abnormality flag XPinj to "0". That is, the EG determines that there is no misfire abnormality in the port injection valves 24. After that, the EG proceeds with the process to step 1080 and sets the value of the change request flag XDreq to "0", after which the EG proceeds with the process to step 1095 and once ends the routine. As a result, the EG proceeds with the process to step 1020.

On the other hand, the EG executes the process of step 1060. When a misfire has not been detected after the abnormality determination injection ratio change time point, the EG may determine that the port injection valves 24 cause the misfire detected in step 820 in FIG. 8.

When a misfired has not been detected after the abnormality determination injection ratio change time point, the EG makes negative determination in step 1060 and proceeds with the process to step 1085. In step 1085, the EG sets the value of the port injection valve abnormality flag XPinj to "1". That is, the EG determines that there is a misfire abnormality in the port injection valves 24. Furthermore, the EG proceeds with the process to step 1090, and sets the value of the in-cylinder injection valve abnormality flag XDinj to "0". That is, the EG determines that there is no misfire abnormality in the in-cylinder injection valves 23. After that, the EG proceeds with the process to step 1080 and sets the value of the change request flag XDreq to "0" after which the EG proceeds with the process to step 1095 and once ends the routine. As a result, the EG proceeds with the process to step 1020.

As described above, the hybrid vehicle 10 includes a power transmission mechanism (30, 50), driving force control unit (see the routine shown in FIG. 3) and abnormality determination unit (see step 820 in FIG. 8). The power transmission mechanism (30, 50) couples the drive shaft 53 of the vehicle to the engine 20 such that torque is transmittable and that couples the drive shaft 53 to the electric motor (second motor generator MG2) such that torque is transmittable. The driving force control unit controls the engine 20 and the electric motor MG2 such that the torque equal to the user required torque that is the torque required to rotate the drive shaft 53, which is determined on the basis of the user's accelerator operation amount AP, is caused to act on the drive shaft 53. The abnormality determination unit determines whether a misfire has occurred in the engine 20.

Furthermore, in the hybrid vehicle 10, the driving force control unit controls the engine 20 and the electric motor MG2 (see step 320, step 325 and step 335 to step 360 in FIG. 3) such that the engine 20 is operated at the engine operation point that satisfies the engine required power Pe* based on the user required torque Tu* and the vehicle speed SPD in the first engine operation line (optimal engine operation line) Lopt that is determined by the output torque Te of the engine 20 and the engine rotation speed Ne and an insufficient torque for the user required torque Tu* (that is, the torque Tm2, see the above-described mathematical expression (6)) in the case where the output torque of the engine 20 is transmitted to the drive shaft 53 by the power transmission mechanism is compensated by the output torque of the electric motor MG2. In addition, the driving force control unit controls the engine 20 and the electric motor MG2 (see step 320, step 330 and step 335 to step 360 in FIG. 3) such that, when it is determined by the abnormality determination unit that a misfire has occurred in a state where fuel is injected from both the set of in-cylinder injection valves 23 and the set of port injection valves 24 (see affirmative determination in step 820, negative determination in step 830, negative determination in step 860, and step 890 in FIG. 8), the engine 20 is operated at the engine operation point that satisfies the engine required power Pe* in the second engine operation line (injection valve abnormality determination engine operation line) Ldij that is determined by the output torque Te of the engine 20 and the engine rotation speed Ne and an insufficient torque for the user required torque Tu* (that is, the torque Tm2, see the above-described mathematical expression (6)) in the case where the output torque of the engine 20 is transmitted to the drive shaft 53 by the power transmission mechanism is compensated by the output torque of the electric motor MG2. Furthermore, when the engine 20 is operated at the engine operation point in the second engine operation line, the driving force control unit causes the entire amount of fuel that is supplied to the engine 20 to be injected from one of the set of in-cylinder injection valves 23 and the set of port injection valves 24 (see step 720, step 760 and step 770 in FIG. 7, step 890 in FIG. 8, affirmative determination in step 1010, and step 1040 in FIG. 10).

Furthermore, in the hybrid vehicle 10, in the case where the engine 20 is operated at the engine operation point in the second engine operation line and the entire amount of fuel is supplied to the engine 20 from one of the set of in-cylinder injection valves 23 and the set of port injection valves 24 (see step 1060 to step 1075 in FIG. 10), the abnormality determination unit determines that the set of injection valves from which the entire amount of fuel is injected is abnormal when the abnormality determination unit determines that a misfire has occurred, and determines that the set of injection valves from which the fuel is not injected is abnormal when the abnormality determination unit determines that a misfire has not occurred (see step 1060, step 1085 and step 1090 in FIG. 10).

Thus, with the hybrid vehicle 10, it is possible to determine which one of the set of in-cylinder injection valves 23 and the set of port injection valves 24 is abnormal by changing the operating state of the engine 20 to a state where the engine 20 is allowed to operate in one of the in-cylinder injection drive mode and the port injection drive mode while satisfying the user required torque (that is, the engine operation point is changed from a point in the first engine operation line to a point in the second engine operation line). Thus, it is possible to identify the set of fuel injection valves, which causes a misfire without a feeling of strangeness experienced by the user.

In addition, the driving force control unit may be configured to operate the engine 20 at the engine operation point in the second engine operation line when the hybrid vehicle 10 is travelling in the case where it is determined by the abnormality determination unit that a misfire has occurred (change request flag XDreq=1) in a state where fuel is injected from both the set of in-cylinder injection valves 23 and the set of port injection valves 24 (see the description of step 320 in FIG. 3 and negative determination in step 1030 in FIG. 10), and not to operate the engine 20 at the engine operation point in the second engine operation line (operate the engine 20 at the engine operation point in the first engine operation line) when the hybrid vehicle 10 is stopped even when it is determined by the abnormality determination unit that a misfire has occurred in a state where fuel is injected from both the set of in-cylinder injection valves 23 and the set of port injection valves 24.

The invention is not limited to the above-described embodiment; various alternative embodiments may be employed within the scope of the invention. For example, the EG may set the in-cylinder injection ratio rd to "0" in step 1040 in FIG. 10. In this case (in the case where the in-cylinder injection ratio rd is set to "0"), when a misfire has been detected, the EG determines that there is a misfire abnormality in the port injection valves 24; whereas, when a misfire has not been detected, the EG determines that there is a misfire in the in-cylinder injection valves 23.

Furthermore, the second engine operation line may be present in an intermediate load range. That is, the second engine operation line may be set between the line Lopt and the line Ldij in FIG. 5. In addition, step 1030 in FIG. 10 may be omitted. In this case, the EG proceeds with the process to step 1040 when affirmative determination is made in step 1010.

Furthermore, the hybrid vehicle 10 is not limited to the above-described embodiment; the hybrid vehicle 10 may be of any type that includes a power transmission mechanism that couples a drive shaft of the vehicle to an engine such that torque is transmittable and that couples the drive shaft to an electric motor such that torque is transmittable and that is able to control the engine and the electric motor such that a torque equal to the user required torque Tu* is caused to act on the drive shaft.

What is claimed is:

1. A hybrid vehicle comprising:
   an internal combustion engine including an in-cylinder injection valve and a port injection valve, the in-cylinder injection valve directly injecting fuel into a combustion chamber, and the port injection valve injecting fuel into an intake port that communicates with the combustion chamber;
   an electric motor;
   a power transmission mechanism configured to couple a drive shaft of the hybrid vehicle to the engine to transmit torque and to couple the drive shaft to the electric motor to transmit torque;
   a driving force control unit configured to control the engine and the electric motor such that a torque being determined on the basis of a user's accelerator operation amount is caused to act on the drive shaft, the torque being equal to a user required torque that is required to rotate the drive shaft; and
   an abnormality determination unit configured to determine whether a misfire occurs in the engine, wherein
   the driving force control unit is configured to control the engine and the electric motor such that i) the engine is operated at an engine operation point that satisfies an engine required power that is determined on the basis of the user required torque and a vehicle speed of the hybrid vehicle in a first engine operation line that is determined by an output torque of the engine and a rotation speed of the engine and ii) an insufficient torque for the user required torque in a case where the output torque of the engine is transmitted to the drive shaft by the power transmission mechanism is compensated by an output torque of the electric motor,
   the driving force control unit is configured to control the engine and the electric motor such that iii) the engine is operated at an engine operation point that satisfies the engine required power in a second engine operation line that is determined by the output torque of the engine and the rotation speed of the engine in a case where the abnormality determination unit determines, that a misfire occurs and fuel is injected from both the in-cylinder injection valve and the port injection valve and iv) an insufficient torque for the user required torque in the case where the output torque of the engine is transmitted to the drive shaft by the power transmission mechanism is compensated by the output torque of the electric motor,
   the driving force control unit is further configured to cause one of the in-cylinder injection valve and the port injection valve to inject an entire amount of fuel that is supplied to the engine when the engine is operated at the engine operation point in the second engine operation line, and
   when the engine is operated at the engine operation point in the second engine operation line and the entire amount of fuel that is supplied to the engine is injected from the one of the in-cylinder injection valve and the port injection valve, the abnormality determination unit is configured to determine that the one of the in-cylinder injection valve and the port injection valve, which is injecting the entire amount of fuel, is abnormal when the abnormality determination unit determines that a misfire occurs, and to determine that the other one of the in-cylinder injection valve and the port injection valve, which is not injecting the fuel, is abnormal when the abnormality determination unit determines that a misfire does not occur.

2. The hybrid vehicle according to claim 1, wherein
the driving force control unit is configured to operate the engine at the engine operation point in the second engine operation line when the hybrid vehicle is travelling in the case where the abnormality determination unit determines that a misfire occurs in a state where fuel is injected from both the in-cylinder injection valve and the port injection valve, and not to operate the engine at the engine operation point in the second engine operation line when the hybrid vehicle is stopped in the case where the abnormality determination unit determines that a misfire occurs and fuel is injected from both the in-cylinder injection valve and the port injection valve.

3. The hybrid vehicle according to claim 1, wherein
the first engine operation line and the second engine operation line are determined such that i) an efficiency of the engine in a case where the engine is operated at the engine operation point in the first engine operation line while outputting a predetermined engine power is higher than an efficiency of the engine in a case where the engine is operated at the engine operation point in the second engine operation line while outputting the predetermined engine power and ii) a load of the engine in the case where the engine is operated at the engine operation point in the first engine operation line while outputting the predetermined engine power is higher than a load of the engine in the case where the engine is operated at the engine operation point in the second engine operation line while outputting the predetermined engine power.

4. A method for controlling a hybrid vehicle including;
an internal combustion engine including an in-cylinder injection valve and a port injection valve, the in-cylinder injection valve directly injecting fuel into a combustion chamber, and the port injection valve injecting fuel into an intake port that communicates with the combustion chamber;
an electric motor;
a power transmission mechanism configured to couple a drive shaft of the hybrid vehicle to the engine to transmit torque and to couple the drive shaft to the electric motor to transmit torque;
a driving force control unit configured to control the engine and the electric motor such that a torque being determining on the basis of a user's accelerator operation amount is caused to act on the drive shaft, the torque being equal to a user required torque that is required to rotate the drive shaft; and
an abnormality determination unit configured to determine whether a misfire occurs in the engine,
the control method comprising:
controlling the engine and the electric motor such that i) the engine is operated at an engine operation point that satisfies an engine required power that is determined on the basis of the user required torque and a vehicle speed of the hybrid vehicle in a first engine operation line that is determined by an output torque of the engine and a rotation speed of the engine and ii) an insufficient torque for the user required torque in a case where the output torque of the engine is transmitted to the drive shaft by the power transmission mechanism is compensated by an output torque of the electric motor, controlling the engine and the electric motor such that iii) the engine is operated at an engine operation point that satisfies the engine required power in a second engine operation line that is determined by the output torque of the engine and the rotation speed of the engine in a case where the abnormality determination unit determines that a misfire occurs and fuel is injected from both the in-cylinder injection valve and the port injection valve and iv) an insufficient torque for the user required torque in the case where the output torque of the engine is transmitted to the drive shaft by the power transmission mechanism is compensated by the output torque of the electric motor, causing one of the in-cylinder injection valve and the port injection valve to inject an entire amount of fuel that is supplied to the engine when the engine is operated at the engine operation point in the second engine operation line, and when the engine is operated at the engine operation point in the second engine operation line and the entire amount of fuel that is supplied to the engine is injected from the one of the in-cylinder injection valve and the port injection valve, determining that the one of the in-cylinder injection valve and the port injection valve, which is injecting the entire amount of fuel, is abnormal when a misfire occurs, and determining that the other one of the in-cylinder injection valve and the port injection valve, which is not injecting the fuel, is abnormal when a misfire has not occurred.

* * * * *